United States Patent
Jiao

(10) Patent No.: US 8,174,534 B2
(45) Date of Patent: May 8, 2012

(54) SHADER PROCESSING SYSTEMS AND METHODS

(75) Inventor: Yang (Jeff) Jiao, San Jose, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1187 days.

(21) Appl. No.: 11/951,867

(22) Filed: Dec. 6, 2007

(65) Prior Publication Data

US 2009/0147017 A1   Jun. 11, 2009

(51) Int. Cl.
G09G 5/00 (2006.01)
G06T 15/50 (2006.01)
G06T 15/60 (2006.01)

(52) U.S. Cl. ........................ 345/582; 345/426

(58) Field of Classification Search ............... 345/582, 345/506, 531, 426

See application file for complete search history.

(56) References Cited

U.S. PATENT DOCUMENTS

| | | | |
|---|---|---|---|
| 5,949,424 A | 9/1999 | Cabral et al. | |
| 6,392,655 B1 | 5/2002 | Migdal et al. | |
| 6,433,789 B1 | 8/2002 | Rosman | |
| 6,437,788 B1 | 8/2002 | Milot et al. | |
| 6,456,291 B1 | 9/2002 | Fowler | |
| 6,724,394 B1 | 4/2004 | Zatz et al. | |
| 6,784,895 B1 | 8/2004 | Munshi | |
| 7,454,599 B2 | 11/2008 | Jiao et al. | |
| 7,456,835 B2 * | 11/2008 | Lindholm et al. | 345/501 |
| 7,589,741 B1 * | 9/2009 | Donham et al. | 345/582 |
| 7,676,657 B2 * | 3/2010 | Lindholm et al. | 712/220 |
| 7,692,660 B2 | 4/2010 | Markovic et al. | |
| 2002/0070946 A1 | 6/2002 | Lewis et al. | |
| 2002/0089511 A1 | 7/2002 | Munshi et al. | |
| 2003/0076320 A1 | 4/2003 | Collodi | |
| 2003/0151608 A1 | 8/2003 | Chung et al. | |
| 2004/0012563 A1 | 1/2004 | Papakipos et al. | |
| 2004/0179020 A1 | 9/2004 | Lewis et al. | |
| 2004/0189652 A1 | 9/2004 | Emberling | |
| 2004/0233195 A1 | 11/2004 | Bunnell | |
| 2004/0237074 A1 | 11/2004 | Aronson et al. | |
| 2004/0252126 A1 | 12/2004 | Margittai et al. | |
| 2005/0052449 A1 | 3/2005 | Emberling | |
| 2009/0066714 A1 * | 3/2009 | Liao et al. | 345/582 |
| 2009/0128575 A1 * | 5/2009 | Liao et al. | 345/552 |

FOREIGN PATENT DOCUMENTS

| | | |
|---|---|---|
| CN | 1056968 A | 12/1991 |
| CN | 1928918 A | 3/2007 |

OTHER PUBLICATIONS

English translation of abstract of CN 1928918 A.
English translation of abstract of CN 1056968 A.

* cited by examiner

*Primary Examiner* — Jacinta M Crawford
(74) *Attorney, Agent, or Firm* — Thomas, Kayden, Horstemeyer & Risley, LLP

(57) ABSTRACT

Various embodiments of shader processing systems and methods are disclosed. One method embodiment, among others, comprises a dependent texture read method executed using a multi-threaded, parallel computational core of a graphics processing unit (GPU). Such a method includes generating a dependent texture read request at logic configured to perform shader computations corresponding to a first thread, and sending shader-calculated, texture-sampling related parameters corresponding to the first thread to a texture pipeline while retaining at the logic all other shader processing related information corresponding to the first thread.

13 Claims, 9 Drawing Sheets

SHADER PROCESSING SYSTEMS AND METHODS

TECHNICAL FIELD

The present disclosure is generally related to data processing systems, and more particularly, is related to programmable graphics processing systems and methods.

BACKGROUND

As is known, the art and science of three-dimensional ("3-D") computer graphics concerns the generation, or rendering, of two-dimensional ("2-D") images of 3-D objects for display or presentation onto a display device or monitor, such as a cathode ray tube (CRT) or a liquid crystal display (LCD). The object may be a composition of simple geometry primitives such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinates (x, y, z, w) that define a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processing unit, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (x, y, z in "model" coordinates) and some specification of material surface properties (e.g., color, texture, shininess, etc.), as well as possibly the normal vectors to the surface at each vertex. For 3-D objects with complex curved surfaces, the polygons in general are typically triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume to include or eliminate background as desired.

Once this viewing area has been selected, clipping logic eliminates the polygons (e.g., triangles) which are outside the viewing area and "clips" the polygons that are partly inside and partly outside the viewing area. These clipped polygons correspond to the portion of the polygon inside the viewing area with new edge(s) corresponding to the edge(s) of the viewing area. The polygon vertices are then transmitted to the next stage in coordinates corresponding to the viewing screen (in x, y coordinates) with an associated depth for each vertex (the z-coordinate). In a typical system, the lighting model is next applied, taking into account the light sources. In some implementations, a lighting model may be applied prior to clipping. The polygons with their color values are then transmitted to a rasterizer.

For each polygon, the rasterizer determines which pixels are positioned in the polygon and attempts to write the associated depth (z-value) into a depth buffer. The rasterizer produces blank pixels and compares the depth (z-value) for the pixels of the polygon being processed with the depth value of a pixel that is already written to the depth buffer. If the depth value of the new polygon pixel is smaller, indicating that it is in front of the polygon already written into the frame buffer, then its value replaces the value in the depth buffer because the new polygon obscures the polygon previously processed and written into the depth buffer. This process is repeated until all of the polygons have been rasterized and depth tested.

Subsequently, the associated texture is typically fetched and applied to visible pixels of polygons. The texture, or rather texture values, may be accompanied by color values interpolated from vertex colors. A pixel processing stage subsequently merges all these values into a final pixel value that is written to the frame buffer. At that point, a video controller displays the contents of the frame buffer on a display one scan line at a time in raster order.

With this general background provided, reference is now made to FIG. 1, which shows a functional flow diagram of certain components within a fixed function graphics pipeline in a graphics processor system. It should be appreciated that components within graphics pipelines may vary among different systems, and may be illustrated in a variety of ways. As is known, a host computer 10 (or a graphics application programming interface (API) running on a host computer) may generate a command list through a command stream processor 12. The command list comprises a series of graphics commands and data for rendering an "environment" on a graphics display. Components within the graphics pipeline may operate on the data and commands within the command list to render a screen in a graphics display.

In this regard, a parser 14 may receive commands from the command stream processor 12 and "parse" through the data to interpret commands and pass data defining graphics primitives along (or into) the graphics pipeline. Note that the command stream processor 12 may comprise parser functionality is some systems. In this regard, graphics primitives may be defined by location data (e.g., x, y, z, and w coordinates) as well as lighting and texture information. All of this information, for each primitive, may be retrieved by the parser 14 from the command stream processor 12, and passed to a vertex shader 16. As is known, the vertex shader 16 may perform various transformations on the graphics data received from the command list. In this regard, the data may be transformed from world coordinates into model view coordinates, into projection coordinates, and ultimately into screen coordinates. The functional processing performed by the vertex shader 16 is known and need not be described further herein. Thereafter, the graphics data may be passed onto rasterizer 18, which operates as summarized above.

Thereafter, a z-test 20 (depth test) is performed on each pixel within the primitive. As is known, comparing a current z-value (i.e., a z-value for a given pixel of the current primitive) with a stored z-value for the corresponding pixel location comprises performing a z-test. The stored z-value provides the depth value for a previously rendered primitive for a given pixel location. If the current z-value indicates a depth that is closer to the viewer's eye than the stored z-value, then the current z-value replaces the stored z-value and the current graphic information (i.e., color) replaces the color information in the corresponding frame buffer pixel location (as determined by the pixel shader 22). If the current z-value is not closer to the current viewpoint than the stored z-value, then neither the frame buffer nor z-buffer (depth buffer) contents needs to be replaced, as a previously rendered pixel is hence deemed to be in front of the current pixel. For pixels within primitives that are rendered and determined to be closer to the viewpoint than previously-stored pixels, information relating to the primitive is passed on to the pixel shader 22, which determines color information for each of the pixels within the primitive that are determined to be closer to the current viewpoint. The pixel shader 22 also passes texture coordinates and other information to a first-in, first-out buffer (herein, FIFO) 26, which provides such data to a texture unit 28 for texture processing.

The complexity and magnitude of graphics data in a pipeline suggests that pipeline inefficiencies, delays, and bottlenecks can significantly compromise the performance of the pipeline. For instance, one potential bottleneck involves what is commonly referred to as dependent reads, as provided with the loop comprising the pixel shader 22 and a texture pipeline comprising the FIFO 26 and texture unit 28. Typically, when texture sampling is to be performed within a pixel shader 22, a multitude of information needs to be swapped from the pixel shader 22 to the FIFO 26, which is then passed to the texture unit 28 and then ultimately returned to the pixel shader 22. That is, the FIFO 26 acts as a latency cache or buffer to store all such information while the pixel shader 22 is switched to another task or thread to hide the latency associated with the dependent read. Upon receipt of texture data, such information and the texture data is returned to the pixel shader 22 to resume processing of the pixels.

Such information that is passed to the FIFO 26 may include a return address for the sample request (e.g., return address upon completion of the dependent read), texture coordinates, pixel masks, task identifier, and the contents of a plurality of registers corresponding to a certain thread and processing related data.

A conventional system and method for handling this multitude of information pertaining to a dependent read request in the pixel shader 22 is to break pixels into batches by software (e.g., driver software) or rasterizer hardware. The received pixels (e.g., 2×2 tiles or in any other form) are received at the input to the pixel shader 22. A first portion of the pixel shader 22 (i.e., before the first dependent read request) is executed on these received pixels, then the above-mentioned information is sent to the texture pipeline comprising the FIFO 26 and the texture unit 28. The pixel shader 22 may continue processing pixels received at its input while waiting for the texture pipeline to complete the first batch of dependent read requests on the previous pixels. However, the pixel shader 22 stops receiving new pixels at a certain threshold point or capacity, and hence ends or completes a batch. The batch flows in the closed loop of the pixel shader 22, FIFO 26, and texture unit 28 for a number of times (referred to as dependent read passes) until all pixels in the batch have completed all dependent reads and the thread is completed (pixel shader processing has completed for a given batch).

In conventional systems and methods, the batch size is calculated by the software (driver) with careful consideration to prevent dead-lock. For instance, consider a FIFO 26 having a total storage of 3000 units (e.g., units associated with a number (e.g., 3000) herein refer to bits or bytes), with each pixel (e.g., 2×2 tiles or in any other granularity) requiring 8 units for storing the contents of temporary registers and 2 units for dependent read texture coordinates in the first pass, 15 units for storing the contents of registers, and 5 units for coordinates. Accordingly, the batch size is set to 3000/max (first pass storage needed, second pass storage needed, ... etc.)=3000/max (8+2, 15+5, ... etc.)=50 pixels, for example. In this example, if more than 50 pixels are permitted to enter the loop, the system will lock up when these pixels start producing more data than that which can be held in the second pass. Further challenges to proper FIFO allocation may be presented due to variations in the size of pixel data, and/or parallel pixel shaders 22 may have different objects being processed with a different number of pixel data types involved, and hence for every request in the case of a common latency FIFO, a different number of entries may need to be reserved.

Conventional systems and methods typically only support a fixed number of dependent read passes, such as by configuring a pass control register to limit the passes to a defined amount (e.g., up to 4 passes). However, graphics processing technology has experienced an increased sophistication, with APIs and/or applications having the ability to support unlimited dependent read passes and dynamic control flow, like dynamic branch, loop and subroutines (data dependent code branch). With this increased graphics software sophistication is a need for more sophisticated hardware control logic to support these and other advanced dependent read features.

SUMMARY

Embodiments of the present disclosure provide shader processing systems and methods.

One method embodiment, among others, comprises a dependent texture read method executed using a multi-threaded, parallel computational core of a graphics processing unit (GPU). Such a method includes generating a dependent texture read request at logic configured to perform shader computations corresponding to a first thread, and sending shader-calculated, texture-sampling related parameters corresponding to the first thread to a texture pipeline while retaining at the logic all other shader processing related information corresponding to the first thread.

One system embodiment, among others, comprises execution unit logic residing in a multi-threaded, parallel computational core of a graphics processing unit (GPU), the execution unit logic configured to perform shader computations corresponding to a first thread, the execution unit logic further configured to generate a dependent texture read request corresponding to the first thread. The system further comprises a texture pipeline configured to receive shader-calculated, texture-sampling related parameters corresponding to the first thread from the execution unit logic, the execution unit logic further configured to store all other shader processing related information corresponding to the first thread internal to the execution unit logic.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of shader processing systems and methods can be better understood with reference to the following drawings. The components in the drawings are not necessarily to scale, emphasis instead being placed upon clearly illustrating the principles of the systems and methods. Moreover, in the drawings, like reference numerals designate corresponding parts throughout the several views.

DETAILED DESCRIPTION

Disclosed herein are various embodiments of shader processing systems and methods. One embodiment of such shader processing systems comprise one or more execution units of a multi-threaded, parallel computational core of a graphics processing unit (GPU) in cooperation with fixed function texture logic (e.g., texture filtering unit, texture address generator) and first-in, first-out (FIFO) buffer or cache (the texture logic and FIFO collectively referred to herein as a texture pipeline). Some embodiments may comprise more than one texture pipeline. Each of the one or more execution units includes internal storage for rendering-context related information pertaining to pixel shader processing. In the preferred embodiments, dependent reads for texture sampling are implemented by providing shader calculated, texture-sampling related parameters to a texture pipeline while retaining rendering-context related information in internal storage of each execution unit. In short, the above-described, execution unit-based control scheme of the preferred embodiments replaces the conventional scheme of a fixed number of passes as controlled by pass control registers, the latter which inefficiently consumes instructions to swap all rendering-context data and texture-sampling related parameters from a fixed function pixel shader to a texture pipeline to enable a subsequent task to be performed. Benefits resulting from the preferred embodiments include reduced cycle times and read/write bandwidths, thus enabling virtually unlimited dependent reads and low latency performance.

Figure 1:
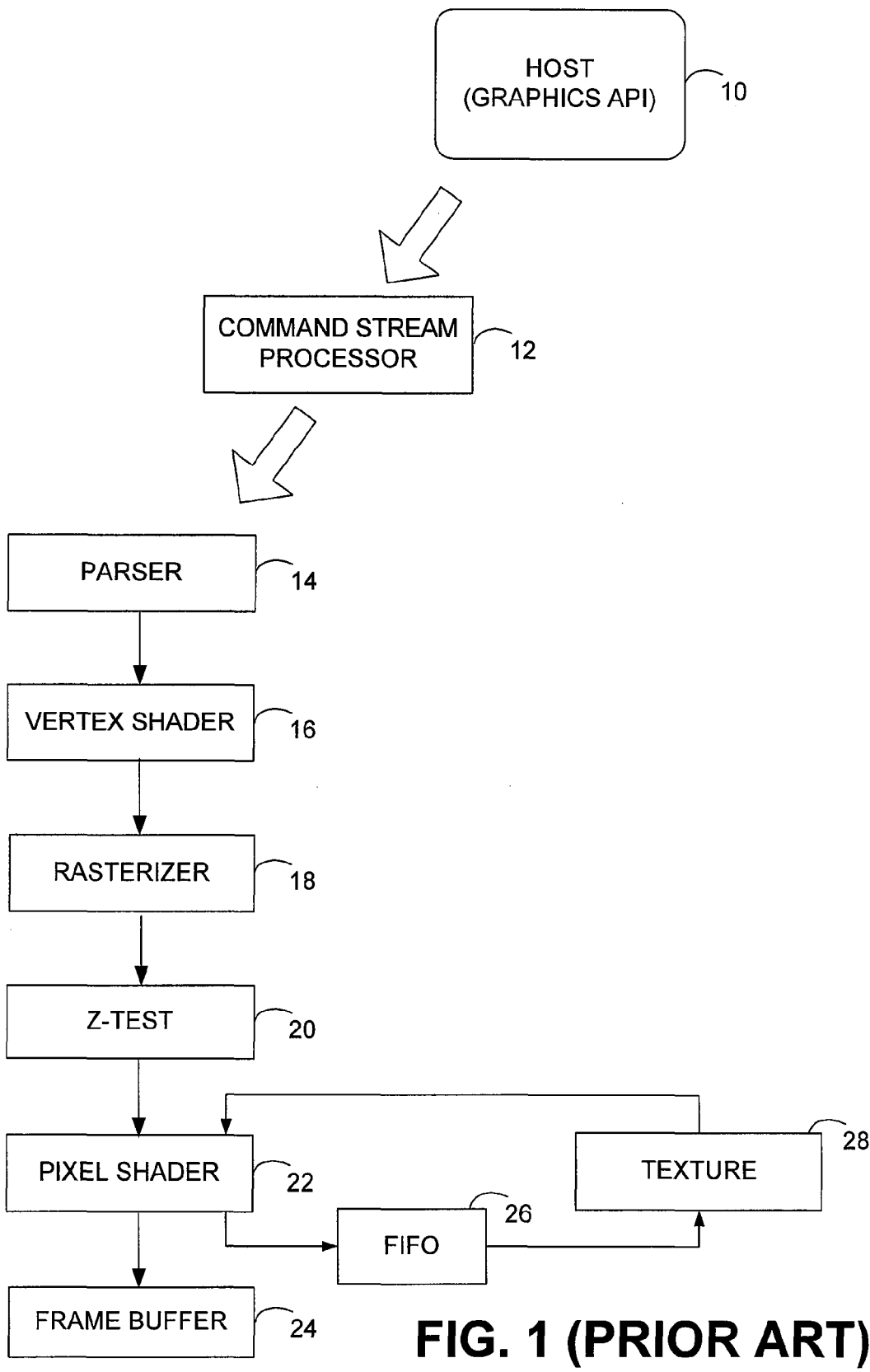
FIG. 1 is a functional flow diagram that illustrates blocks or portions of an exemplary fixed-function graphics processor system.
Figure 2:
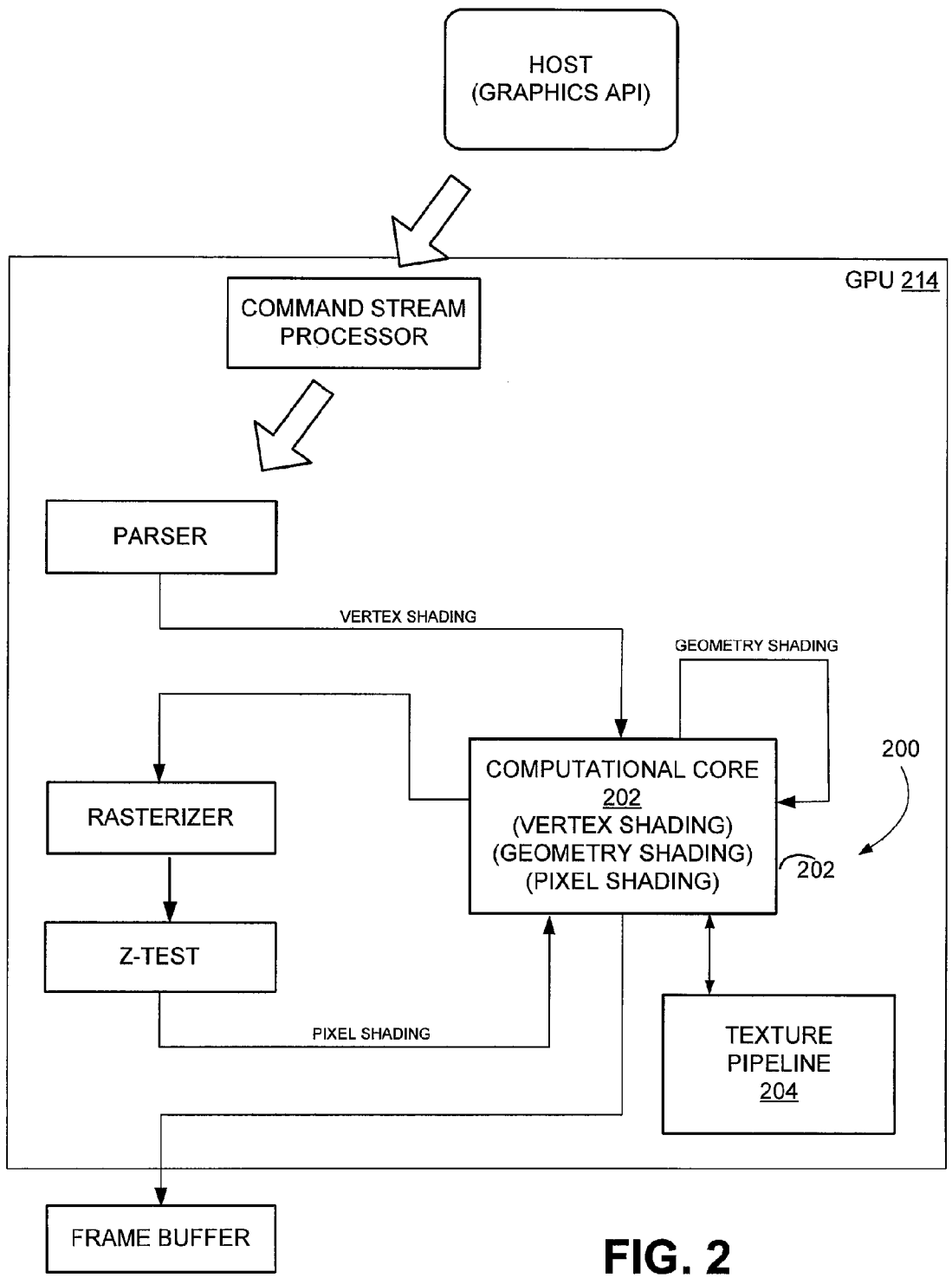
FIG. 2 is a high-level block diagram that illustrates a graphics processor system in which embodiments of shader processing systems and methods are implemented.

FIG. 2 is a high-level block diagram that illustrates a graphics processor system in which embodiments of shader processing systems and methods (herein, collectively shader processing system 200) are implemented in accordance with one or more embodiments. As shown, FIG. 2 is a diagram similar in some respects to the prior art diagram of FIG. 1, and a comparison of the two diagrams illustrates certain advancements of the disclosed embodiments. In short, a graphics processing unit (GPU) 214 is shown. The GPU 214 comprises a single hardware element that comprises a computational core 202 (also known as a software programmable core processing unit) having a shared pool of execution units, wherein each execution unit is provided to handle the computations of pixel shading, vertex shading, and geometry shading. In one embodiment, the shader processing system 200 is distributed among the plurality of execution units and the texture pipeline 204. In some embodiments, additional components may be considered within the scope of a shader processing system 200.

The computational core 202 comprises a plurality of like execution units, each of which may be configured for multi-threaded processing. At any given time, certain of the execution units (or even certain of the threads) may be configured to carry out pixel shading operations, while other execution units (or threads) are configured to carry out geometry shading and/or vertex shading operations. The configuration, and dynamic re-configuration, of the various execution units (or threads) may be performed on a workload, backlog, and/or demand basis. That is, as demands for shading operations are made, then unused execution units (or threads) may be allocated to perform those operations. As the execution units (or their resources) become unavailable (e.g., due to use in performing computations), then the system may perform more intelligent scheduling of these execution units or their resources.

Figure 3:
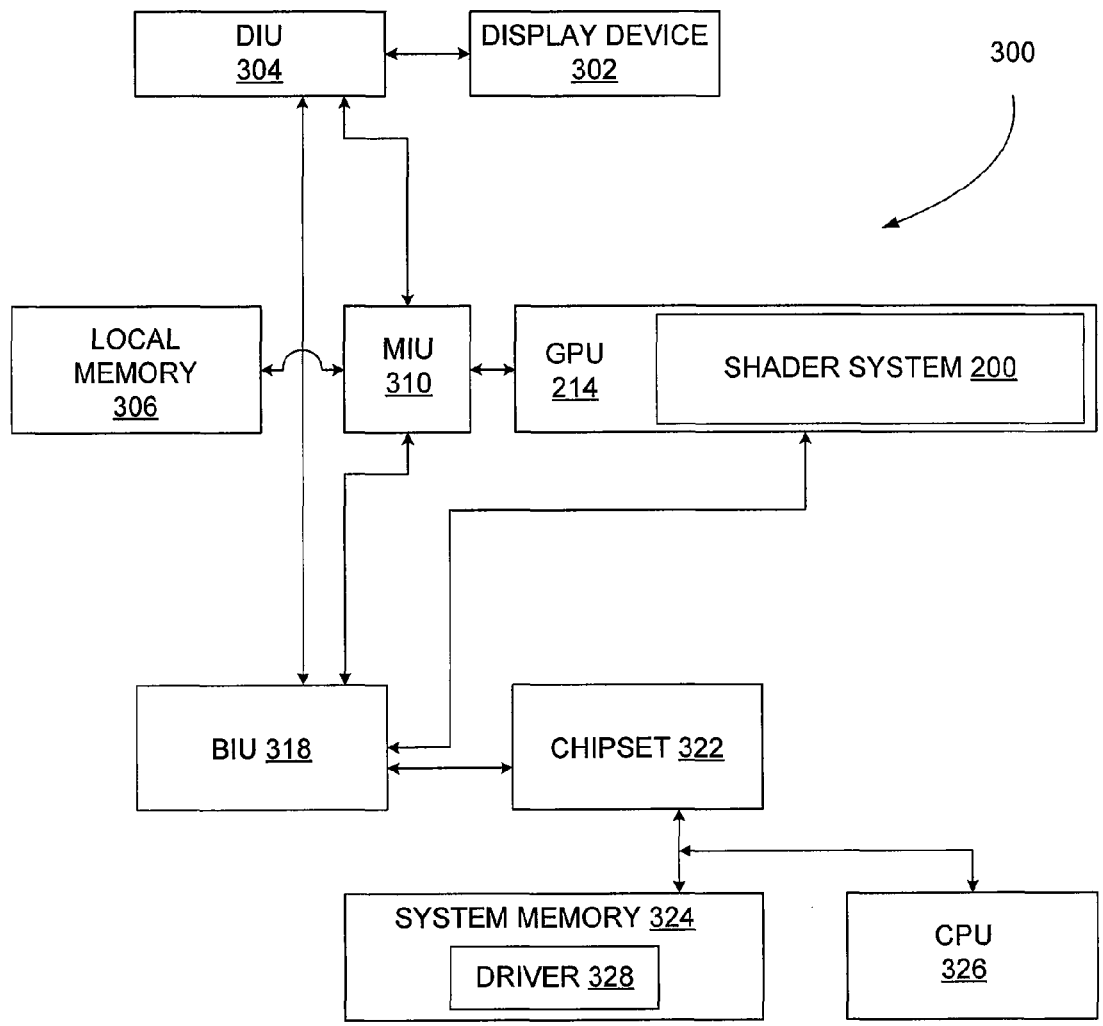
FIG. 3 is a block diagram that illustrates an embodiment of a graphics processor system, similar to that shown in FIG. 2, in which a shader processing system embodiment is implemented.

Having described a high-level view of an embodiment of a shader processing system 200, an exemplary environment in which such embodiments may be implemented is described below. Namely, FIG. 3 is a block diagram of an embodiment of a graphics processor system 300 in which embodiments of a shader processing system 200 are implemented. In some implementations, the graphics processor system 300 may be configured as a computer system. The graphics processor system 300 may comprise a display device 302 driven by a display interface unit (DIU) 304 and local memory 306 (e.g., which may comprise a display buffer, texture buffer, command buffer, frame buffer, etc.). Local memory 306 may also be referred to interchangeably herein as a frame buffer or storage unit. Local memory 306 is coupled to the graphics processing unit (GPU) 214 through one or more memory interface units (MIU) 310. The MIU 310, GPU 214, and DIU 304 are coupled in one embodiment to a peripheral component interconnect express (PCI-E) compatible bus interface unit (BIU) 318. In one embodiment, the BIU 318 may employ a graphics address remapping table (GART), although other memory mapping mechanisms may be employed in some embodiments. The GPU 214 includes the shader processing system 200, as described herein. Although shown as a component of the GPU 214, in some embodiments, the shader processing system 200 may include one or more additional components of the graphics processor system 300 that are shown, or different components.

The BIU 318 is coupled to a chipset 322 (e.g., north bridge chipset) or switch. The chipset 322 comprises interface electronics to strengthen signals from a central processing unit (CPU) 326 (also referred to herein as a host processor) and to separate signals to and from a system memory 324 from those signals going to and from input/output (I/O) devices (not shown). Although a PCI-E bus protocol is described, other manners of connection and/or communication between the host processor 326 and the GPU 314 may be implemented in some embodiments (e.g., PCI, proprietary high-speed bus, etc.). The system memory 324 also comprises driver software 328, which communicates instruction sets or commands through the use of the CPU 326 to registers in the GPU 214.

Additional graphics processing units may be employed in some embodiments, coupled for instance to the components shown in FIG. 3 through the chipset 322 via a PCI-E bus protocol, among other mechanisms. In one embodiment, the graphics processor system 300 may embody all of the components shown in FIG. 3, or in some embodiments, fewer and/or different components than those shown in FIG. 3. Further, in some embodiments, additional components may be used, such as a south bridge chipset coupled to the chipset 322.

Figure 4:
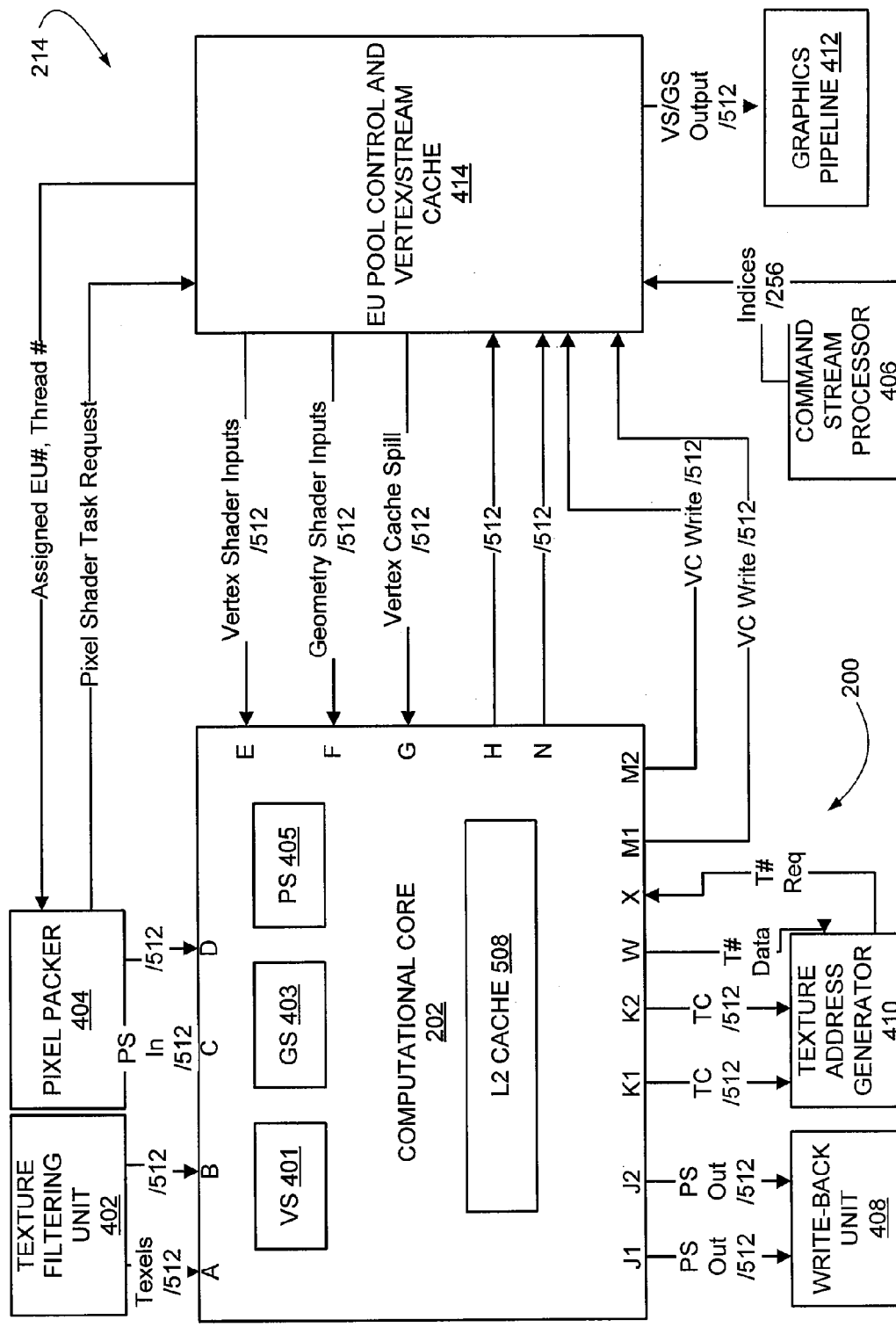
FIG. 4 is a block diagram that illustrates portions of the graphics processor system shown in FIGS. 2 and 3.

Reference is now made to FIG. 4, which is a block diagram showing certain components of the example GPU 214 shown in FIG. 3. While not all components for graphics processing are shown, the components shown in FIG. 4 should be sufficient for one having ordinary skill in the art to understand the general functions and architecture related to such graphics processors. At the center of the programmable processing environment is the multiple execution unit computational core 202, which processes various instructions and includes at least a portion of the shader processing system 200 distributed among the execution units. Various types of shaders can be executed or mapped to the computational core 202, including a vertex shader 401, geometry shader 403, and pixel shader 405. In one embodiment, shader logic includes one or more execution units of the computational core 202 and one or more of the vertex shader 401, geometry shader 403, and pixel shader 405. That computational core 202, for multi-issue processors, is capable of processing multiple instructions within a single clock cycle.

As shown in FIG. 4, the relevant components of the GPU 214 comprise the computational core 202, a texture filtering unit 402, a pixel packer 404, a command stream processor 406, a write-back unit 408, and a texture address generator 410. Note that the texture pipeline 204 (FIG. 2) comprises, in one embodiment, the texture filtering unit 402 and texture address generator 410, as well as various controllers and caches not shown, as described further below. Also included in FIG. 4 is the execution unit (EU) pool control unit 414, which also includes a vertex cache and/or a stream cache. In some embodiments, some or all of the functionality of the computational core 202 and the EU pool control unit 414 can be combined into a single unit (e.g., the computational core 202 may include, in whole or in part, functionality of the EU pool control unit 414).

The computational core 202 receives inputs from various components and outputs to various other components. For example, as shown in FIG. 4, the texture filtering unit 402, which comprises an output portion of the texture pipeline 204, provides texel data to execution unit thread registers of the computational core 202 (inputs A and B). For some embodiments, the texel data is provided as 512-bit data, though not limited as such. The pixel packer 404 provides pixel shader inputs to the computational core 202 (inputs C and D), also in 512-bit data format in one embodiment. Additionally, the pixel packer 404 requests new pixel shader tasks (e.g., when a new pixel group arrives to the pixel packer 404 for further processing in shader logic) from the EU pool control unit 414, which provides an assigned execution unit identification (e.g., number) and a thread identification (e.g., number) to the pixel packer 404. Further information about pixel packer functionality may be found in commonly assigned U.S. Patent Publication Nos. 2005/0093873 and 2005/0093872, herein both incorporated by reference in their entirety. Since texture filtering units 402 are known in the art, further discussion of this component is omitted here. While FIG. 4 shows the pixel and texel packets as 512-bit data packets, it should be appreciated that the size of the packets can be varied for some embodiments, depending on the desired performance characteristics of the GPU 214.

Figure 5:
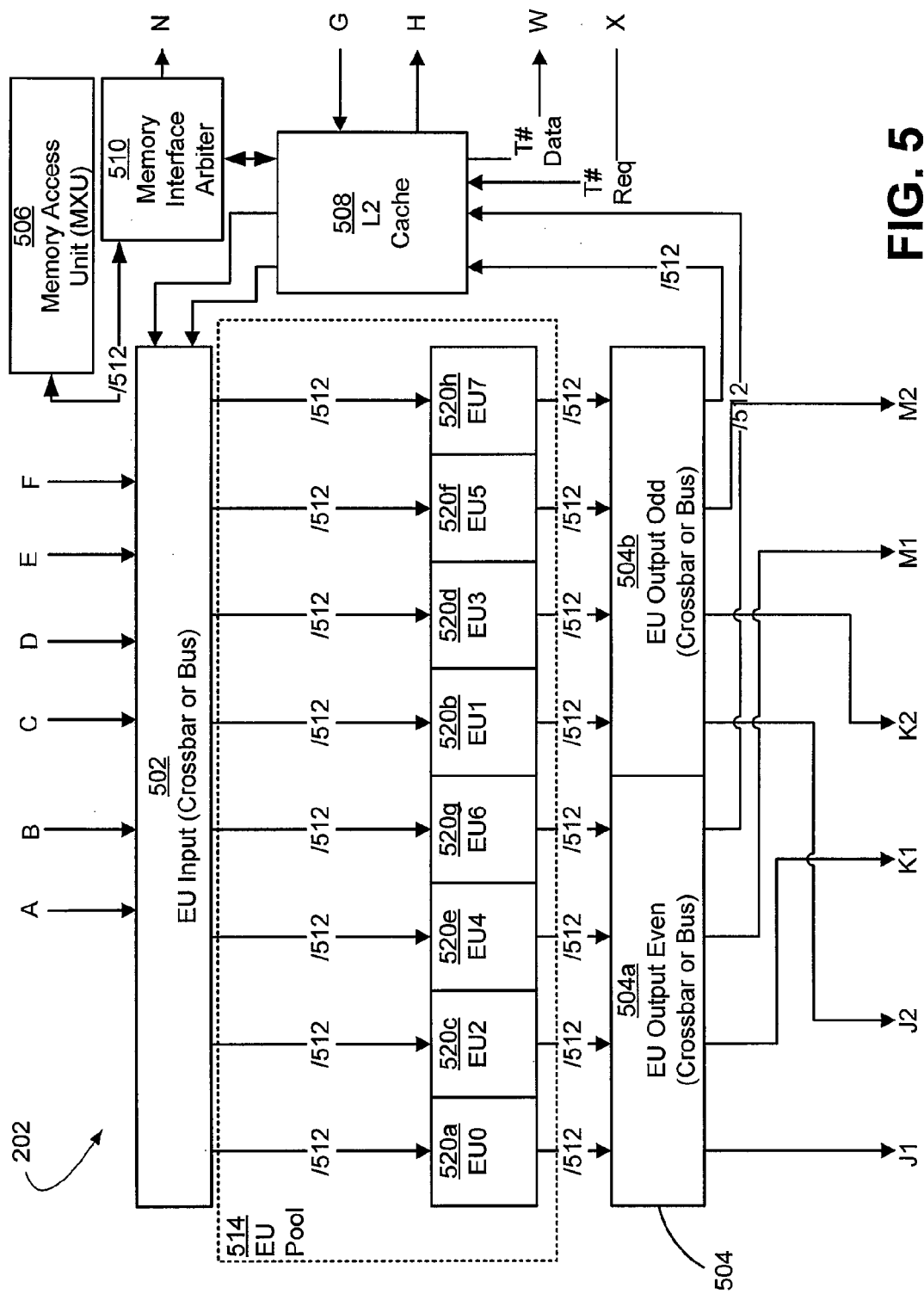
FIG. 5 is a block diagram that illustrates an embodiment of an execution unit pool of the computational core shown in FIG. 4.

The command stream processor 406 provides triangle vertex indices to the EU pool control unit 414. In the embodiment of FIG. 4, for example, 32-bit indices are sent in groups of eight (8), comprising a total of 256 bits. The EU pool control unit 414 assembles vertex shader inputs from the stream cache and sends data to the computational core 202 (input E). The EU pool control unit 414 also assembles geometry shader inputs and provides those inputs to the computational core 202 (input F). The EU pool control unit 414 also controls an EU input 502 (FIG. 5) and an EU output 504 (FIG. 5). In other words, the EU pool control unit 414 controls the respective inflow and outflow to the computational core 202.

Upon processing, the computational core 202 provides pixel shader outputs (outputs J1 and J2) to the write-back unit 408. The pixel shader outputs include red/green/blue/alpha (RGBA) information, which is known in the art. Given the data structure in the disclosed embodiment, the pixel shader output may be provided as two 512-bit data streams. Other bit-widths may also be implemented in some embodiments.

Similar to the pixel shader outputs, the computational core 202 outputs texture coordinates (outputs K1 and K2), which include UVRQ information, to the texture address generator 410. The texture address generator 410 comprises an input portion of the texture pipeline 204. The texture address generator 410 receives texture coordinates (TC) with texture descriptor number (T#), as well as an execution unit identification and thread identification, from shader logic in a respective execution unit 520 (FIG. 5) that is to implement a dependent texture read. The texture address generator 410 issues a texture descriptor request (T# Req) to a level-2 (L2) cache 508 of the computational core 202 (input X), and the L2 cache 508 of the computational core 202 outputs (output W) the texture descriptor data (T# data) along with texture coordinates to the texture address generator 410. The texture address generator 410 may generate an address corresponding to a texture fetch and send the execution unit identification and thread identification to a texture fetch channel (see FIG. 7, block 710). The texture fetch channel returns the fetched texture (e.g., fetched texture data) to the texture filtering unit 402 along with the execution unit identification and thread identification. The texture filtering unit 402 uses such information to write texels to the proper execution unit thread registers.

Also shown is a graphics pipeline 412 with fixed function logic (e.g., including a triangle set-up unit (TSU), span-tile generator (STG), etc.).

Figure 6:
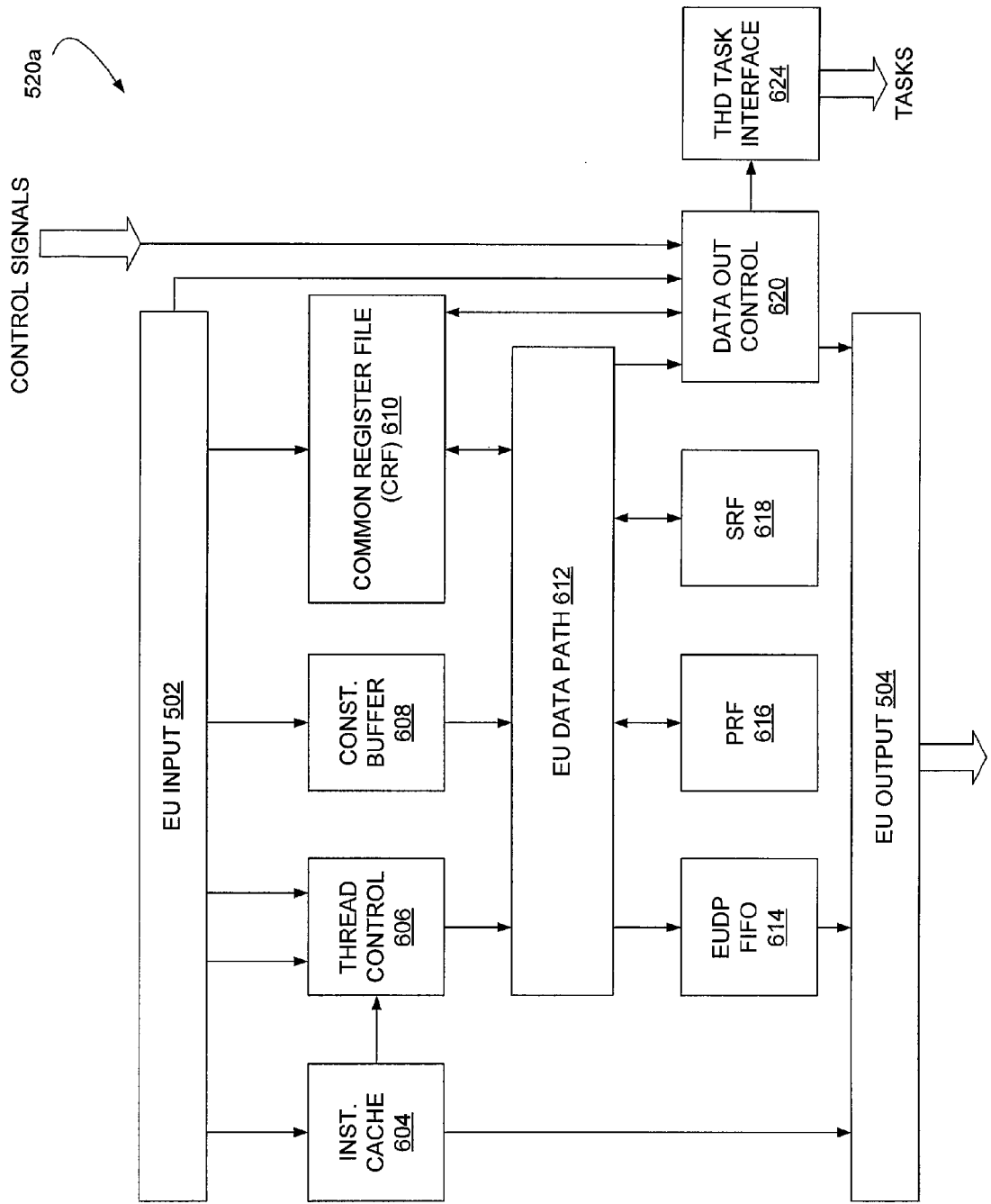
FIG. 6 is a block diagram that illustrates an embodiment of an execution unit of the computational core shown in FIG. 5.

Additional discussion pertaining to inputs and outputs with respect to the texture pipeline 204 are discussed below in association with FIG. 6. Again, while the UVRQ and the RGBA are shown as 512 bits, it should be appreciated that this parameter may also be varied for other embodiments. In the embodiment of FIG. 4, the bus is separated into two 512-bit channels, with each channel holding the 128-bit RGBA color values and the 128-bit UVRQ texture coordinates for four pixels.

The L2 cache 508 of the computational core 202 and the EU pool control unit 414 also transfer to each other 512-bit vertex cache spill data. Additionally, two 512-bit vertex cache writes are output from the computational core 202 (outputs M1 and M2) to the EU pool control unit 414 for further handling.

Having described the data exchanges pertaining to the computational core 202 and associated components, attention is turned to FIG. 5, which shows a block diagram of various components within the computational core 202. As shown in FIG. 5, the computational core 202 comprises a memory access unit 506 that is coupled to the L2 cache 508 through a memory interface arbiter 510.

The L2 cache 508 receives vertex cache spill (input G) from the EU pool control unit 414 and provides vertex cache spill (output H) to the EU pool control unit 414. Additionally, the L2 cache 508 receives T# descriptor requests (input X) from the texture address generator 410, and provides the T# descriptor data (output W) to the texture address generator 410 in response to the received request.

The memory interface arbiter 510 provides a control interface to the local video memory (e.g., frame buffer, such as found in local memory 306). The BIU 318 provides an interface to the system through, for example, a PCI-E bus. The memory interface arbiter 510 and BIU 318 provide the interface between the memory 306 and the L2 cache 508. For some embodiments, the L2 cache 508 connects to the memory interface arbiter 510 and the BIU 318 through the memory access unit 506. The memory access unit 506 translates virtual memory addresses from the L2 cache 508 and other blocks to physical memory addresses.

The memory interface arbiter 510 provides memory access (e.g., read/write access) for the L2 cache 508, fetching of instructions/constants/data/texture, direct memory access (e.g., load/store), indexing of temporary storage access, register spill, vertex cache content spill, etc.

The computational core 202 also comprises an execution unit pool 514, which includes multiple execution units (EUs) 520a through 520h (collectively or individually referred to herein as 520, except as noted below for purpose of distinction). In one embodiment, at least a portion of the shader processing system 200 is embodied in each execution unit 520. That is, in some embodiments, the shader processing system 200 comprises each execution unit 520 and additional components, such as the texture pipeline 204 (FIG. 2), logic in the EU pool control unit 414, etc. Each of the execution units 520 is capable of processing multiple instructions within a single clock cycle. Thus, the EU pool 514, at its peak, can process multiple threads substantially simultaneously. These execution units 520 of the EU pool 514, and their substantially concurrent processing capacities, are described in greater detail below. While eight (8) execution units 520 are shown in FIG. 5 (labeled EU0 through EU7), it should be appreciated that the number of execution units need not be limited to eight, but may be greater or fewer in number for some embodiments.

The computational core 202 further comprises an EU input 502 and an EU output 504, which are respectively configured to provide the inputs to the EU pool 514 and receive the outputs from the EU pool 514. The EU input 502 and the EU output 504 may be crossbars or buses or other known input mechanisms.

The EU input 502 receives the vertex shader input (E) and the geometry shader input (F) from the EU pool control unit 414, and provides that information to the EU pool 514 for processing by the various execution units 520. Additionally, the EU input 502 receives the pixel shader input (inputs C and D) and the texel packets (inputs A and B), and conveys those packets to the EU pool 514 for processing by the various execution units 520. Additionally, the EU input 502 receives information from the L2 cache 508 (L2 read) and provides that information to the EU pool 514 as needed.

The EU output 504 in the embodiment of FIG. 5 is divided into an even output 504a and an odd output 504b. Similar to the EU input 502, the EU output 504 can be crossbars or buses or other known architectures. The even EU output 504a handles the output from the even EUs 520a, 520c, 520e, 520g, while the odd EU output 504b handles the output from the odd EUs 520b, 520d, 520f, 520h. Collectively, the two EU outputs 504a, 504b receive the output from the EU pool 514, such as the UVRQ and the RGBA. Those outputs, among others, may be directed back to the L2 cache 508, or output from the computational core 202 to the write-back unit 408 through J1 and J2 or output to the texture address generator 410 through K1 and K2.

Before further describing an execution unit 520 of the EU pool 514, a brief summary of execution unit flow in the context of the architectures shown in FIGS. 2, 4, and 5 is provided below. The execution unit flow of the EU pool 514 in cooperation with the EU pool control unit 414 (collectively, EU pool 514 and EU pool control unit 414 referred to herein as EU pool control logic) generally comprises several levels, including a rendering-context level, thread or task level, and an instruction or execution level. The rendering-context information is passed from the EU pool control logic to a particular execution unit 520 before tasks belonging to this rendering-context are commenced. Rendering-context information may include, for instance, shader type, number of input/output registers, instruction starting address, output mapping table, vertex identifier, and constants in the respective constant buffer. Each execution unit 520 may store a plurality of tasks or threads (e.g., in some embodiments, 32 threads) at the same time. Each thread fetches an instruction according to a program counter. The EU pool control unit 414 assigns a thread to one of the empty thread slots in the respective execution unit 520. Data fed by a vertex cache or other component or module (depending on the shader type) is placed in a common register file or buffer (described below), after which execution of a thread may commence.

In general, the computational core 202 utilizes programmable vertex 401, geometry 403, and pixel shaders 405 (which in some embodiments may collectively share the same instruction set with one or more additions depending on the functionality desired). Rather than implementing the functions of these components as separate, fixed-function shader units with different designs and instruction sets, the operations are instead executed by the pool of execution units 520a, 520b . . . 520h with a unified instruction set. Each of these execution units 520 is identical in design and configurable for programmed operation. In a preferred embodiment, each execution unit 520 is capable of multi-threaded operation simultaneously. As various shading tasks are generated by the vertex shader 401, geometry shader 403, and pixel shader 405, they are delivered to the respective execution units 520 to be carried out.

As individual tasks are generated, the EU pool control unit 414 handles the assigning of those tasks to available threads within the various execution units 520. As tasks are completed, the EU pool control unit 414 further manages the release of the relevant threads. In this regard, the EU pool control unit 414 is responsible for assigning vertex shader, geometry shader, and pixel shader tasks to threads of the various execution units 520, and also performs an associated "bookkeeping" of the tasks and threads. Specifically, the EU pool control unit 414 maintains a resource table (not specifically illustrated) of threads and memories for all execution units 520. The EU pool control unit 414 particularly knows which threads have been assigned tasks and are occupied, which threads have been released after thread termination, how many common register file memory registers are occupied, and how much free space is available for each execution unit.

Accordingly, when a task is assigned to one execution unit (e.g., 520a), the EU pool control unit 414 will mark the thread as busy and subtract the total available common register file memory by the amount of the appropriate register file footprint for each thread. This footprint is set or determined by states for the vertex shader 401, geometry shader 403, and pixel shader 405. Further, each of the shader types or stages may have different footprint sizes. For example, a vertex shader thread may require 10 common register file registers, while a pixel shader thread may only require 5 such registers.

When a thread completes its assigned task(s), the execution unit 520 running the thread sends an appropriate signal to the EU pool control unit 414. The EU pool control unit 414 will, in turn, update its resource table to mark the thread as free and to add the amount of total thread common register file space back to the available space. When all threads are busy or all the common register file memory has been allocated (or there is too little register space remaining to accommodate an additional thread), then the execution unit 520 is considered full and the EU pool control unit 414 will not assign any additional or new threads to that execution unit.

A thread controller (see FIG. 6, block 606) is also provided inside each of the execution units 520, and is responsible for managing or marking each of the threads as active (e.g., executing) or available.

In the context of the above-described environment, what follows is an explanation of an embodiment of an execution unit 520a, which along with the texture pipeline 204, comprises an embodiment of the shader processing system 200. Referring to FIG. 6, shown is a block diagram of certain components of an execution unit 520a, with the understanding that other execution units 520 comprise the same or similar functionality and structure. The execution unit 520a comprises an instruction cache controller 604, thread controller 606, constant buffer 608, common register file (CRF) 610, EU data path (EUDP) 612, EUDP FIFO 614, predicate register file (PRF) 616, scalar register file (SRF) 618, data out controller 620, and a thread task interface 624. The execution unit 520a receives input from EU input 502 and provides an output to EU output 504.

The thread controller 606 provides control functionality for the entire execution unit 520a, with functionality including the management of each thread and decision-making functionality such as determining how threads are to be executed. The EUDP 612 comprises functionality for performing various calculations, and includes such logic as floating point and integer arithmetic logic units (ALUs), shift logic functionality, among other logic.

The data out controller 620 comprises functionality to move finished data to certain components connected to the EU output 504, such as the vertex cache 414, write back unit 408, etc. The EUDP 612 passes "end of task" information to the data out controller 620, notifying the same that a task is completed. The data out controller 620 comprises storage for the completed task (e.g., 32 entries), as well as a plurality of write ports. The data out controller 620 selects tasks from storage, and reads out all output data items in register locations specified by a shader rendering-context from the CRF 610 and sends the data items to the EU output 504. The thread task interface 624 sends out task identifiers that are completed in execution unit 520a to the EU pool control unit 414. That is, the task identifiers provide notification to the EU pool control unit 414 that a thread resource in a particular execution unit, for instance 520a, is available for a new task assignment.

In one embodiment, the constant buffer 608 may be divided up into 16 blocks, with each block having 16 slots with 128-bit horizontal vector constants in each. A constant buffer slot is accessed in a shader using an operand and index, wherein the index may be a temporary register comprising, for example, a 32-bit unsigned integer or an immediate 32-bit unsigned integer constant.

The instruction cache controller 604 is an interface block to the thread controller 606. When there is a thread controller read request (e.g., to fetch executable shader code from instruction memory), the instruction cache controller 604 preferably performs a hit/miss test by looking up a tag table (not shown). For example, a hit occurs when a requested instruction is in a cache of the instruction controller 604. A miss occurs when this requested instruction is to be fetched from the L2 cache 508 or memory 306. In one embodiment, if a hit occurs, the instruction cache controller 604 grants the request if there is no request from the EU input 502 because the instruction cache of the instruction cache controller 604 has 1RW port limitation and the EU input 502 has higher priority. Otherwise, if a miss occurs, the instruction cache controller 604 grants the request when there is a replaceable block in the L2 cache 508 and there is space in pending request EUDP FIFO 614. In one embodiment, the cache of the instruction cache controller 604 comprises 32 sets, with four blocks per set. Each block carries a 2-bit status signal to indicate 3 states of invalid, loading, or valid. A block is "invalid" before being loaded with L2 data, becomes "loading" when waiting for L2 data, and becomes "valid" after L2 data loads in.

The predicate register file (PRF) 616 is read from and written to by the EUDP 612. The EU input 502 serves as an interface for incoming data to the execution unit 520a. In one embodiment, the EU input 502 comprises an 8-entry FIFO to buffer the incoming data. The EU input 502 also comprises functionality to pass data to the instruction cache of the instruction cache controller 604 and the constant buffer 608. The EU input 502 also maintains shader contexts.

The EU output 504 serves as an interface for outgoing data from the execution unit 520a into the vertex cache 414, the L2 cache 508, and the write back unit 408. In one embodiment, the EU output 504 comprises a 4-entry FIFO to receive arbitrated requests and to buffer the data for the EU pool control unit 414. The EU output 504 comprises various functionality, including functionality to arbitrate the request from an instruction cache read request, data out write request, and EUDP read/write request.

The CRF 610 is used to store input, output, and temporary data. In one embodiment, the CRF 610 comprises eight (8) banks with 1R1W and 1RW ports of a 128×128-bit register file. The 1R+1W ports are used by the EUDP 612 for read and write access initiated by instruction execution. Banks 0, 2, 4, and 6 are shared among even numbered threads and banks 1, 3, 5, and 7 are shared among odd numbered threads. The thread controller 606 pairs instructions from different threads and ensures that there is no read or write bank conflict on the CRF memories.

The 1RW port is used by the EU input 502 and data out controller 620 for loading the initial thread input data and writing the final thread output to the EU pool control unit data buffers and L2 cache 514 or other modules. The 1RW I/O port is shared by both the EU input 502 and EU output 504, and write in one embodiment has higher priority than read. The 512-bits of the input data goes to four different banks to avoid any conflict when loading data into the CRF 610, and a 2-bit channel index is passed in along with the data and 512-bit aligned base address to specify the starting bank of the input data. For example, if the starting channel index is 1, then the first 128-bit from the least significant bit (LSB) is loaded into bank 1, the next into bank 2, ... etc., and the last into bank 0, assuming the thread based bank offset is 0. Note the two LSBs of the thread ID are used to generate a bank offset to randomize the starting bank location for each thread.

The CRF register index along with the thread ID can be used to construct a unique logical address for tag matching in reading and writing data in the CRF 610. For instance, the address may be aligned to 128 bits, the width of the CRF bank. Thirteen (13) bits of the address may be constructed from combining the 8-bit CRF register index and the 5-bit thread ID to create a unique address. Each 1024-bit line has a tag, and there are two 512-bit entries (words) on each line. Each word is stored across four banks and the two LSBs of the CRF index are added to the bank offset of the current thread to create the bank selection.

The tag matching scheme allows the registers of different threads to share the CRF 610 to make good utilization of the memory, since the EU pool control unit 414 keeps track of memory usage of the CRF 610 and ensures there is enough space before scheduling a new task to the execution unit 520a.

The destination CRF index is checked against the size of the total CRF registers for a current thread. The input data is expected to be present in the CRF 610 before the thread controller 606 commences the thread and shader execution begins. The output data is read from the CRF 610 by the data out controller 620 after thread execution ends.

The total thread storage size per thread for each of the vertex, geometry, and pixel shader stages is provided by a compiler (e.g., GPU compiler), although the EU pool control unit 414 calculates how many threads it can launch into the execution unit 520a (equivalent to the batch size) itself based the task assignment information. Bookkeeping is done by scheduling functionality in the EU pool control unit 414. The task scheduling and load balancing between the vertex, geometry, and pixel shaders is controlled by the EU pool control unit 414, and in one embodiment, is random at runtime and depends on how many tasks (threads) the scheduler of the EU pool control 414 has assigned into each execution unit 520a (e.g., the size of vertex shader, geometry shader, and pixel shader threads may all be different). With the dynamic load balancing and sharing of unified shader units among multiple shader stages (i.e., vertex, geometry, and pixel shader stages), it becomes increasingly complex and difficult, if not impossible or virtually impossible, to calculate the batch size in software. Since the execution units 520 and texture pipeline 204 are shared between all these shader stages, the proportion of the amount of vertex, geometry, and pixel shader tasks and texture request patterns at any specific time in hardware at runtime is totally or substantially random. The software can no longer make the allocation at the compile time as done with fixed function pipelines in conventional systems.

Figure 7:
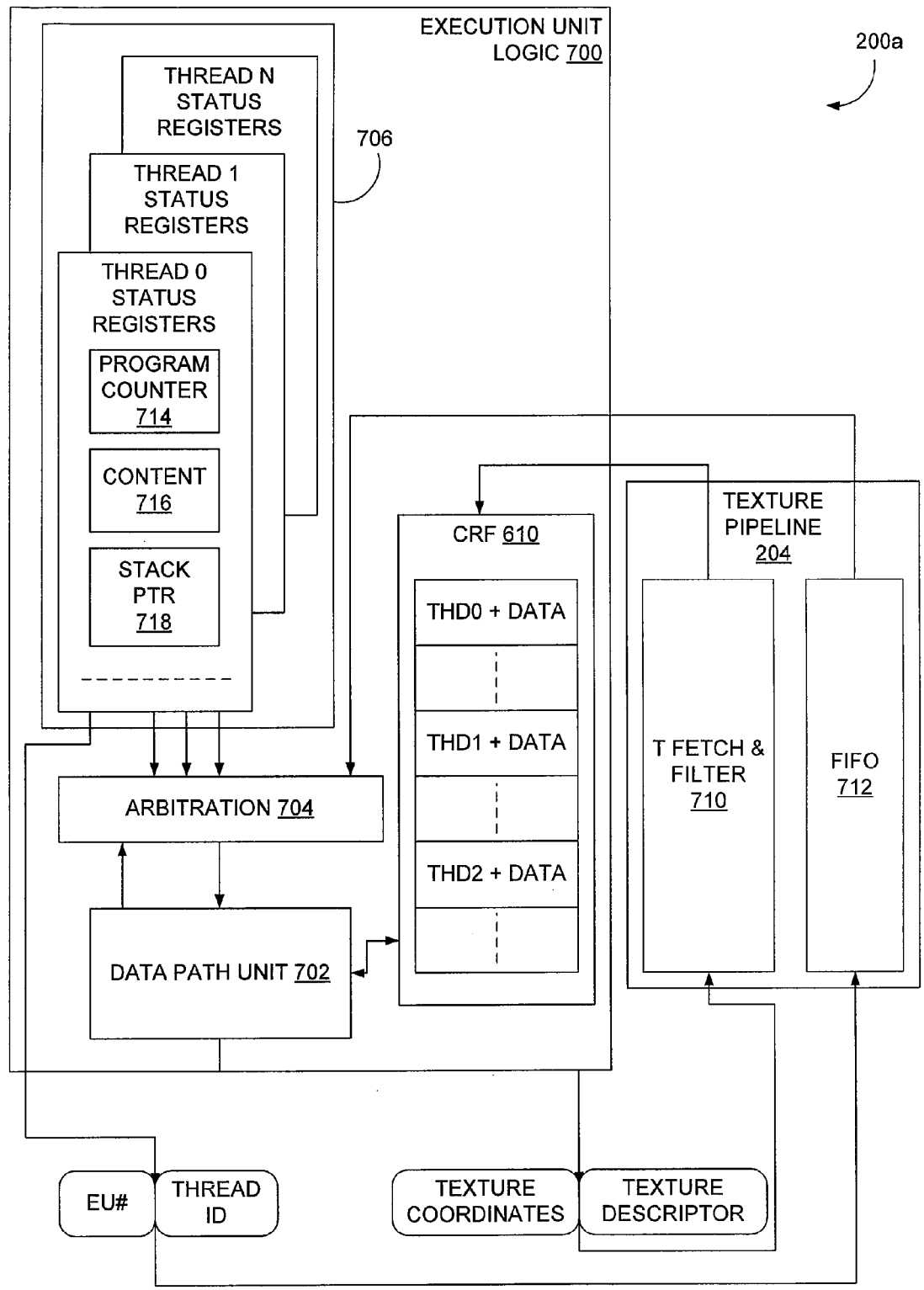
FIG. 7 is a block diagram that illustrates an embodiment of a shader processing system.

Having described the execution unit 520a that comprises at least a portion of one or more embodiments of a shader processing system 200, the block diagram of FIG. 7 illustrates an embodiment of a shader processing system 200, the embodiment referred to herein as shader processing system 200a. Although shown using a single execution unit 520 (e.g., EU 520a), it should be understood in the context of this disclosure by those having ordinary skill in the art that the same or similar architecture can be utilized using one or more execution units 520 of the EU pool 514. As shown, with continued reference to FIG. 6, the shader processing system 200a is shown for an exemplary implementation, and includes execution unit logic 700 (e.g., EU pool control logic) and the texture pipeline 204. The execution unit logic 700 comprises a data path unit 702 (e.g., corresponding to EUDP 612 of each of the execution units 520), an arbitration unit 704 (herein, also arbitration logic), thread controller slots or status registers 706 (e.g., thread 0 status register, thread 1 status register, etc. of the thread controller 606), and common register file (CRF) 610 (e.g., storing calculation-related data of shader register files CRF 610, PRF 616, and SRF 618). The texture pipeline 204 comprises texture fetch and filtering unit 710 (also referred to herein as texture fetch channel), comprising texture filtering unit 402 (FIG. 4) and texture address generator 410 (FIG. 4), and texture fetch latency FIFO 712.

In a dependent texture read operation, in accordance with one embodiment, a portion of information retained in the status registers 706 of the execution unit logic 700 comprises a program counter 714, the contents of one or more status registers 716, and a stack pointer 718 corresponding to one or more active and suspended threads. Also retained in the execution unit logic 700 in a dependent texture read operation is calculation-related data corresponding to a dependent texture read, as stored in the CRF 610.

A dependent texture request is preferably generated in the data path unit 702 during the execution of one or more shader instructions. The data path unit 702 signals the arbitration unit 704 to suspend the existing thread, and enables the delivery of a thread identification (thread ID) and execution unit identification (EU#) to route texture data and also to serve as a return address corresponding to a thread activation request to the texture fetch latency FIFO 712. The data path unit 702 sends out texture coordinates and texture descriptors to the texture fetch and filtering unit 710, which responsively provides texture data to the CRF 610 according to mechanisms described above. At a time corresponding to the receipt of the texture data to the CRF 610, the arbitration unit 704 receives the thread activation request from the texture fetch latency FIFO 712 to remove the suspension of the thread.

Figure 8:
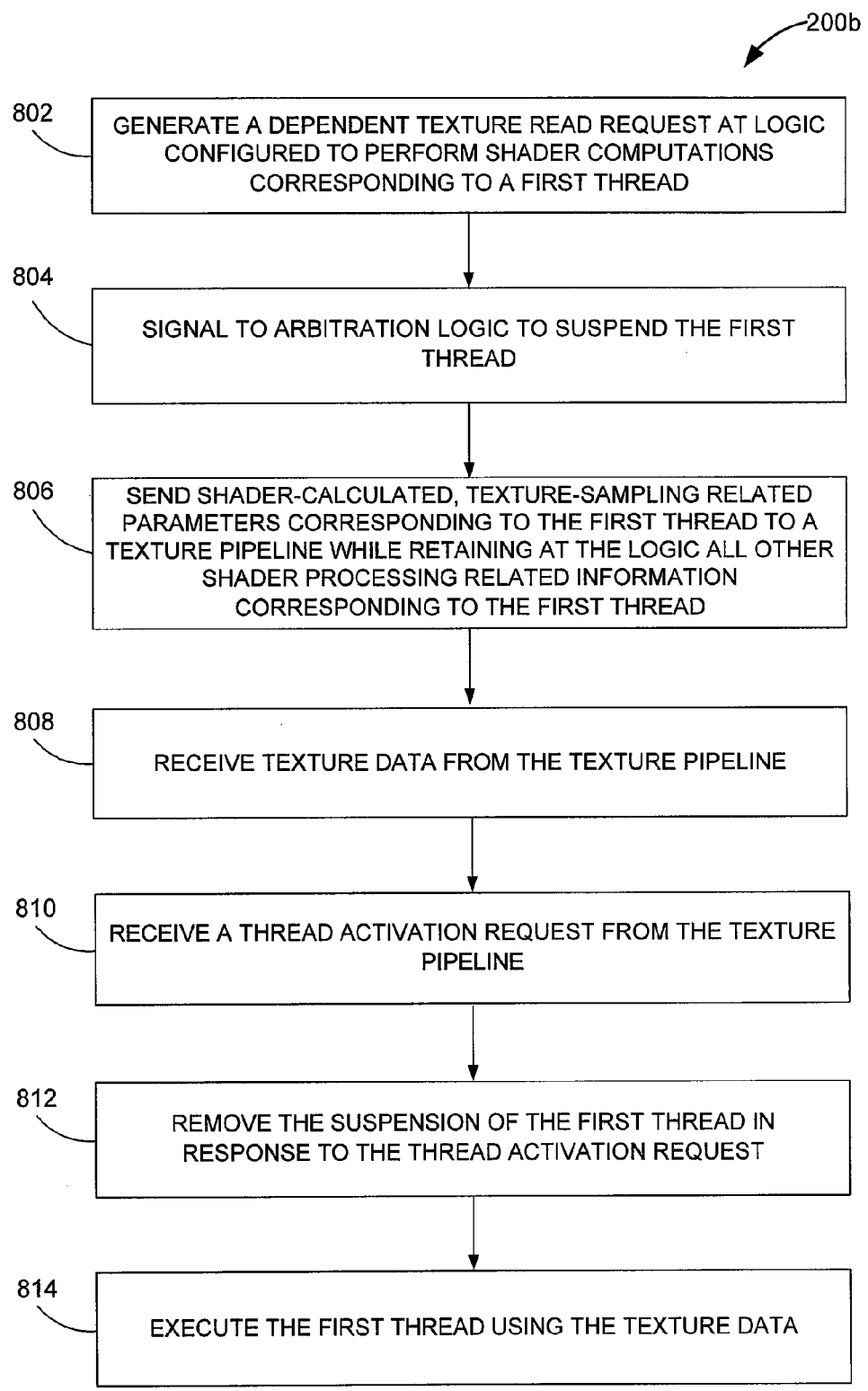
FIG. 8 is a flow diagram that illustrates an embodiment of a shader processing method implemented by the shader processing system shown in FIG. 7.

In light of the above described architecture and functionality for dependent texture read operations, one skilled in the art should appreciate that one embodiment of a shader processing method 200b, illustrated in FIG. 8, comprises generating a dependent texture read request at logic (e.g., execution unit logic 700) configured to perform shader computations corresponding to a first thread (802), signaling to arbitration logic (e.g., arbitration unit 704) to suspend the first thread (804), sending shader-calculated, texture-sampling related parameters corresponding to the first thread to a texture pipeline 204 while retaining at the logic 700 all other shader processing related information corresponding to the first thread (806), receiving texture data from the texture pipeline 204 (808), receiving a thread activation request from the texture pipeline 204 (810), removing the suspension of the first thread in response to the thread activation request (812), and executing the first thread using the texture data (814).

In one embodiment, the shader-calculated, texture-sampling related parameters include an execution unit identification, thread identification, texture coordinates, and a texture descriptor(s), and predicate pixel mask to the texture pipeline 204. The execution unit identification and thread identification serve as a "return address" for the sample request. The other shader processing information retained or stored in the execution unit logic 700 includes rendering-context related information such as program counters, stack pointers, and the contents of stack and thread status registers and shader registers. For instance, such other information may be stored in one or more thread status registers 706 and in the CRF 610. The CRF 610 may store for one or more threads the contents of one or more of the remaining temporary registers in the CRF 610, scalar registers in the SRF 618, predicate registers in the PRF 616, and an address register for indexing constant and temporary register access. Such registers may comprise calculation-related data. The thread status registers 706 may store for one or more threads the contents of the program counter (PC) 714, status register 716, and a stack pointer 718 which are to be maintained for each thread allocated in the EU 520. Note that some of the status registers are allocated directly in the thread controller 606, and/or some may be in predefined positions in any register files.

Figure 9:
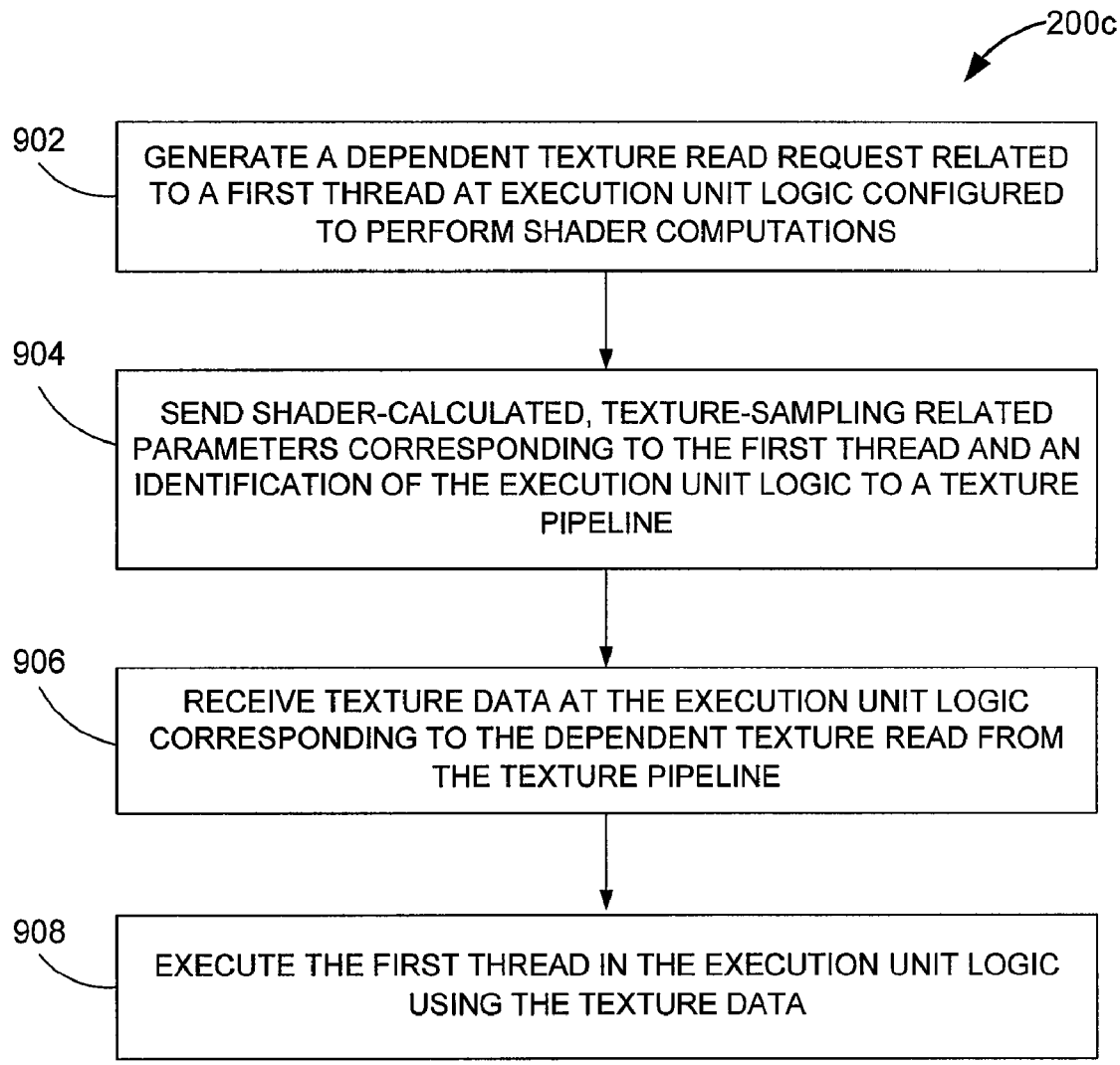
FIG. 9 is a flow diagram that illustrates another embodiment of a shader processing method implemented by the shader processing system shown in FIG. 7.

In light of the above description, one skilled in the art should appreciate that a more generalized shader processing method embodiment 200c, as illustrated in FIG. 9, comprises generating a dependent texture read request at logic (e.g., execution unit logic 700) configured to perform shader computations corresponding to a first thread (902), sending shader-calculated, texture-sampling related parameters corresponding to the first thread to a texture pipeline 204 while retaining at the logic 700 all other shader processing related information corresponding to the first thread (904), receiving texture data from the texture pipeline 204 (906), and executing the first thread using the texture data (908).

Any process descriptions or blocks in flow chart of FIGS. 8 and 9 should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art. Additionally, though described in the context of exemplary architectures as set forth herein, it should be appreciated that the various methods described herein are not limited to these architectures and that other architectures can employ the various methods.

As would be understood from the above description, the shader processing system 200 (e.g., including shader processing system 200a and methods 200b and 200c) can be implemented in hardware, software, firmware, or a combination thereof. In the preferred embodiment(s), the shader processing system 200 is implemented in hardware and firmware, including any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for executing dependent texture read in a multi-threaded graphics processing unit (GPU), comprising:
    generating a dependent texture read request related to a first thread at execution unit logic configured to perform shader computations;
    sending shader-calculated, texture-sampling related parameters corresponding to the first thread and an identification of the execution unit logic to a texture pipeline;
    receiving texture data at the execution unit logic corresponding to the dependent texture read from the texture pipeline; and
    executing the first thread in the execution unit logic using the texture data, wherein the shader-calculated, texture-sampling related parameters comprises an identification of one or more execution unit in parallel system, a thread identification, predicate pixel mask, texture coordinates, and a texture descriptor.

2. A method for executing dependent texture read in a multi-threaded graphics processing unit (GPU), comprising:
    generating a dependent texture read request related to a first thread at execution unit logic configured to perform shader computations;
    sending shader-calculated, texture-sampling related parameters corresponding to the first thread and an identification of the execution unit logic to a texture pipeline;
    receiving texture data at the execution unit logic corresponding to the dependent texture read from the texture pipeline; and
    executing the first thread in the execution unit logic using the texture data, further comprising retaining at the execution unit logic all other shader processing related information corresponding to the first thread, wherein the other shader processing related information comprises a program counter, a stack pointer, task sequential ID corresponding to a pixel shader, destination vertex cache line address corresponding to a vertex and geometry shader, and contents corresponding to one or more of temporary registers of a common register file, scalar registers, predicate registers, and address registers.

3. A method for executing dependent texture read in a multi-threaded graphics processing unit (GPU), comprising:
    generating a dependent texture read request related to a first thread at execution unit logic configured to perform shader computations;
    sending shader-calculated, texture-sampling related parameters corresponding to the first thread and an identification of the execution unit logic to a texture pipeline;
    receiving texture data at the execution unit logic corresponding to the dependent texture read from the texture pipeline; and
    executing the first thread in the execution unit logic using the texture data, further comprising suspending the first thread by arbitration logic in the execution unit logic in response to the dependent read request.

4. The method of claim 3, further comprising receiving a thread activation request at the arbitration logic from the texture pipeline in response to the receiving of the texture data.

5. The method of claim 4, further comprising removing the suspension of the first thread in response to the thread activation request.

6. A shader processing system, comprising:
    execution unit logic residing in a multi-threaded, parallel computational core of a graphics processing unit (GPU), the execution unit logic configured to perform shader computations corresponding to a first thread, the execution unit logic comprising:
    a data path unit configured to generate a dependent read request related to the first thread;
    a common register file configured to receive texture data corresponding to the dependent read request; and
    a texture pipeline configured to receive shader-calculated, texture-sampling related parameters corresponding to the first thread from the execution unit logic in response to the dependent read request, the texture pipeline comprising a FIFO configured to receive an execution unit identification and an thread identification for providing the texture data, wherein the execution logic is further configured with thread status registers from which the execution unit logic sends the shader-calculated, texture-sampling related parameters, wherein the shader-calculated, texture-sampling related parameters comprises one or more of an identification of an execution unit in parallel system, a thread identification, predicate pixel mask, texture coordinates, and a texture descriptor.

7. A shader processing system, comprising:

execution unit logic residing in a multi-threaded, parallel computational core of a graphics processing unit (GPU), the execution unit logic configured to perform shader computations corresponding to a first thread, the execution unit logic comprising:

a data path unit configured to generate a dependent read request related to the first thread;

a common register file configured to receive texture data corresponding to the dependent read request; and a texture pipeline configured to receive shader-calculated, texture-sampling related parameters corresponding to the first thread from the execution unit logic in response to the dependent read request, the texture pipeline comprising a FIFO configured to receive an execution unit identification and an thread identification for providing the texture data, wherein the execution logic is further configured with thread status registers configured to store the other shader processing related information, the other shader processing related information comprising a program counter, a stack pointer, task sequential ID corresponding to a pixel shader, destination vertex cache line address corresponding to a vertex and geometry shader, and contents corresponding to one or more of temporary registers of a common register file, scalar registers, predicate registers, and address registers.

8. A shader processing system, comprising:

execution unit logic residing in a multi-threaded, parallel computational core of a graphics processing unit (GPU), the execution unit logic configured to perform shader computations corresponding to a first thread, the execution unit logic comprising:

a data path unit configured to generate a dependent read request related to the first thread;

a common register file configured to receive texture data corresponding to the dependent read request; and a texture pipeline configured to receive shader-calculated, texture-sampling related parameters corresponding to the first thread from the execution unit logic in response to the dependent read request, the texture pipeline comprising a FIFO configured to receive an execution unit identification and an thread identification for providing the texture data, wherein the execution logic is further configured with arbitration logic, the arbitration logic configured to receive a signal from the data path unit to suspend the first thread in response to the dependent read request.

9. The system of claim 8, wherein the texture pipeline further comprises a texture fetch and filter unit configured to receive texture coordinates and a texture descriptor from the execution unit logic and provide texture data to the common register file of the execution unit logic during the suspension.

10. The system of claim 8, wherein the FIFO is further configured to receive the execution unit identification and the thread identification during the suspension and subsequently provide a thread activation request to remove suspension of the first thread.

11. The system of claim 8, wherein the arbitration logic is further configured to receive a thread activation request for resuming the suspension of the first thread.

12. The system of claim 11, wherein the arbitration logic is further configured to remove the suspension of the first thread in response to the thread activation request.

13. A graphics processing unit (GPU), comprising:

a multi-threaded, parallel computational core, comprising a plurality of execution units, each execution unit comprising:

an execution unit logic, the execution logic comprising: a data path unit configured to perform shader computations corresponding to a first thread, the data path unit further configured to generate a dependent texture read request corresponding to the first thread;

arbitration logic configured to receive a signal from the data path unit of the execution unit logic to suspend the first thread;

thread status registers configured to store shader-calculated, texture-sampling related parameters and other shader processing related information; and a common register file configured to receive texture data; and a texture pipeline comprising:

a FIFO configured to receive an execution unit identification and a thread identification during suspension of the first thread and provide a thread activation request to remove suspension of the first thread; and a texture fetch and filter unit configured to receive texture coordinates and a texture descriptor from the thread status registers and provide the texture data to the common register file during the suspension, wherein the execution unit logic is configured to send the shader-calculated, texture-sampling related parameters corresponding to the first thread to the texture pipeline while retaining at the thread status registers all other shader processing related information corresponding to the first thread.

* * * * *